United States Patent
Chang

(10) Patent No.: US 8,300,399 B2
(45) Date of Patent: Oct. 30, 2012

(54) ELECTRONIC MODULE WITH SHOCKPROOF FUNCTION

(75) Inventor: Chun Chang, Taipei Hsien (TW)

(73) Assignee: Aopen Inc., Xizhi Dist., New Taipei (TW)

(*) Notice: Subject to any disclaimer, the term of this patent is extended or adjusted under 35 U.S.C. 154(b) by 315 days.

(21) Appl. No.: 12/877,089

(22) Filed: Sep. 7, 2010

(65) Prior Publication Data

US 2011/0116355 A1    May 19, 2011

(30) Foreign Application Priority Data

Nov. 13, 2009   (TW) .............................. 98138653 A

(51) Int. Cl.
*G06F 1/16* (2006.01)

(52) U.S. Cl. ................................ 361/679.34; 369/263.1

(58) Field of Classification Search ............. 361/679.34; 369/263.1; 248/633, 634, 636, 638, 618, 248/694

See application file for complete search history.

(56) References Cited

U.S. PATENT DOCUMENTS

| | | | | |
|---|---|---|---|---|
| 5,837,934 A * | 11/1998 | Valavanis et al. | ............. | 174/544 |
| 6,005,768 A * | 12/1999 | Jo | ............................. | 361/679.34 |
| 6,545,865 B2 * | 4/2003 | Zamora et al. | ............ | 361/679.34 |
| 6,621,715 B2 * | 9/2003 | Kitadai | ......................... | 361/801 |
| 7,167,360 B2 * | 1/2007 | Inoue et al. | .............. | 361/679.34 |
| 7,480,136 B2 * | 1/2009 | Lalouette | .................. | 361/679.34 |
| 7,612,994 B2 * | 11/2009 | Ulrich et al. | ............. | 361/679.34 |
| 7,667,960 B2 * | 2/2010 | Miyairi | ..................... | 361/679.34 |
| 8,120,902 B2 * | 2/2012 | Dozier et al. | ............. | 361/679.36 |
| 2003/0209639 A1 * | 11/2003 | Tuttle et al. | .................. | 248/27.1 |
| 2010/0051778 A1 * | 3/2010 | Wu | ............................... | 248/562 |

* cited by examiner

*Primary Examiner* — Lisa Lea Edmonds
(74) *Attorney, Agent, or Firm* — Winston Hsu; Scott Margo

(57) ABSTRACT

An electronic module includes a case, a holding frame, a removable disk drive, a transmission cable, a fixing part, and a shock-absorbing structure. An opening is formed on the case. The holding frame is disposed at a position of the case corresponding to the opening. The removable disk drive is disposed on the holding frame and is removable from the opening. The transmission cable is connected to the removable disk drive. The fixing part is disposed on the holding frame. The shock-absorbing structure is movably disposed between the fixing part and the holding frame and envelops the transmission cable.

20 Claims, 5 Drawing Sheets

ELECTRONIC MODULE WITH SHOCKPROOF FUNCTION

BACKGROUND OF THE INVENTION

1. Field of the Invention

The present invention relates to an electronic module with a shockproof function, and more specifically, to an electronic module utilizing a pulling rod, a shock-absorbing pad, and a shock-absorbing structure enveloping a transmission cable for providing a shock-absorbing function and a vibration-isolating function to a removable hard disk drive.

2. Description of the Prior Art

For a small-sized computer or a notebook, there is usually no additional shockproof design applied to a hard disk drive due to its limited inner space. Thus, vibration from its outer environment can be easily transmitted to the hard disk drive through its case. If the hard disk drive works under a normal condition, the hard disk drive can sustain this vibration itself. However, when the hard disk drive works in a particular environment of high vibration (e.g. a bus or a factory), a crash or data damages of the hard disk drive having no additional shockproof design may appear accordingly due to excessive vibration.

As mentioned above, an additional shockproof design for a hard disk drive should be a concern for a small-sized computer or a notebook in its structural design. In the prior art, a conventional shockproof method involves enveloping a hard disk drive with a shock-absorbing structure made of damping material. The disadvantage of this method is that the shock-absorbing effect of the shock-absorbing structure may be lowered if the shock-absorbing structure is not attached to the hard disk drive appropriately. Furthermore, since the shock-absorbing structure of one size can not fit hard disk drives of various sizes, the device compatibility of this method is poor. Besides, this method can only provide a shock-absorbing function to the hard disk drive, meaning that it can not provide a vibration-isolating function. Thus, when the hard disk drive is in a low-frequency vibration environment, the shockproof effect of this method may be reduced.

SUMMARY OF THE INVENTION

The present invention provides an electronic module with a shockproof function, the electronic module comprising a case having an opening formed thereon; a holding frame disposed at a position of the case corresponding to the opening; a removable disk drive disposed on the holding frame in a manner of being removable from the opening; a transmission cable connected to the removable disk drive; a fixing part disposed on the holding frame; and a shock-absorbing structure movably disposed between the fixing part and the holding frame in a manner of enveloping the transmission cable.

The present invention further provides an electronic module with a shockproof function, the electronic module comprising a case having an opening formed thereon; a movable lid pivotally connected to the case for covering the opening; a holding frame disposed at a position of the case corresponding to the opening; a removable disk drive disposed on the holding frame in a manner of being removable from the opening; and a pulling rod pivotally connected to the removable disk drive for propping against the movable lid when the movable lid covers the opening.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
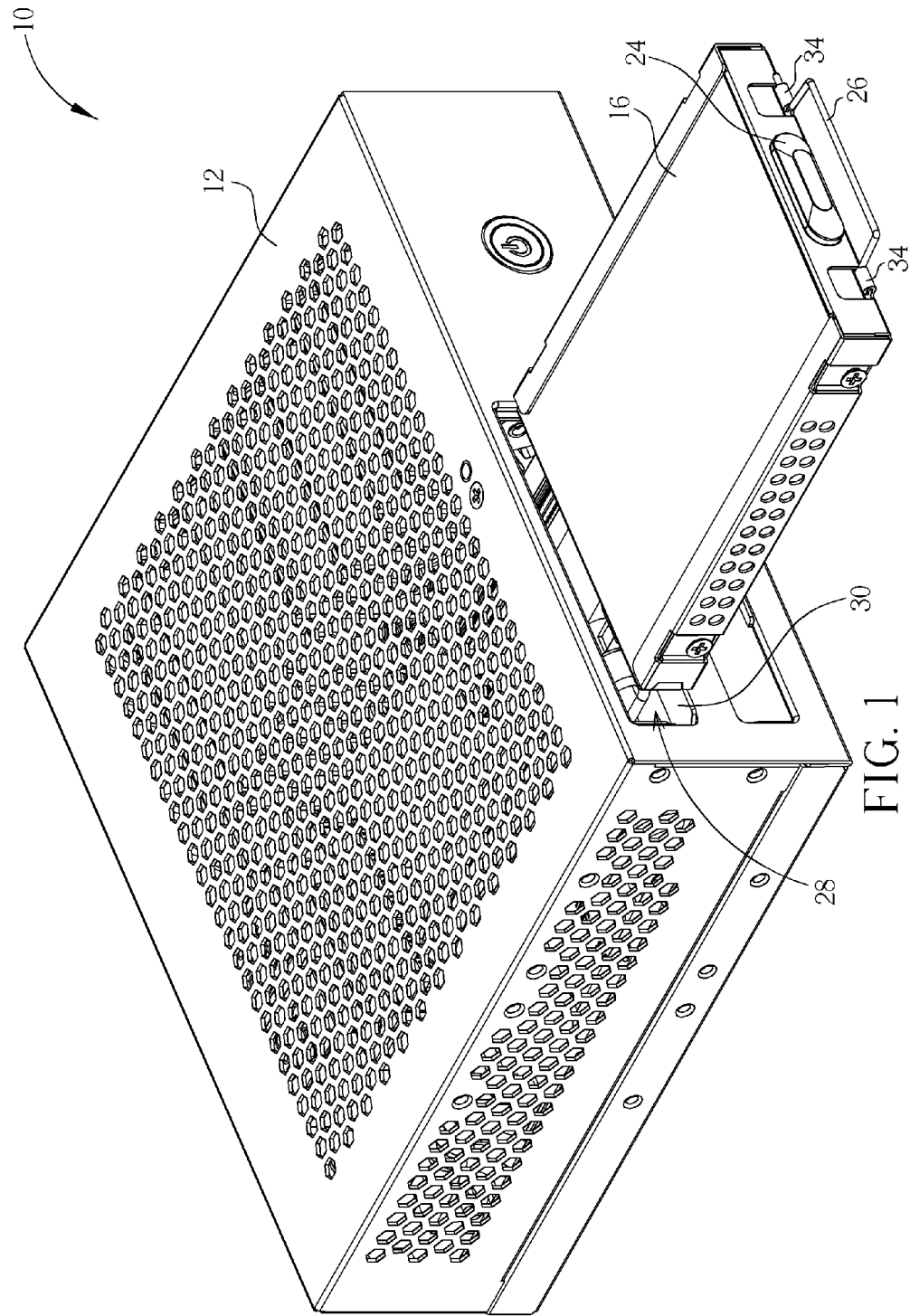
FIG. 1 is a diagram of an electronic module according to a preferred embodiment of the present invention.
Figure 2:
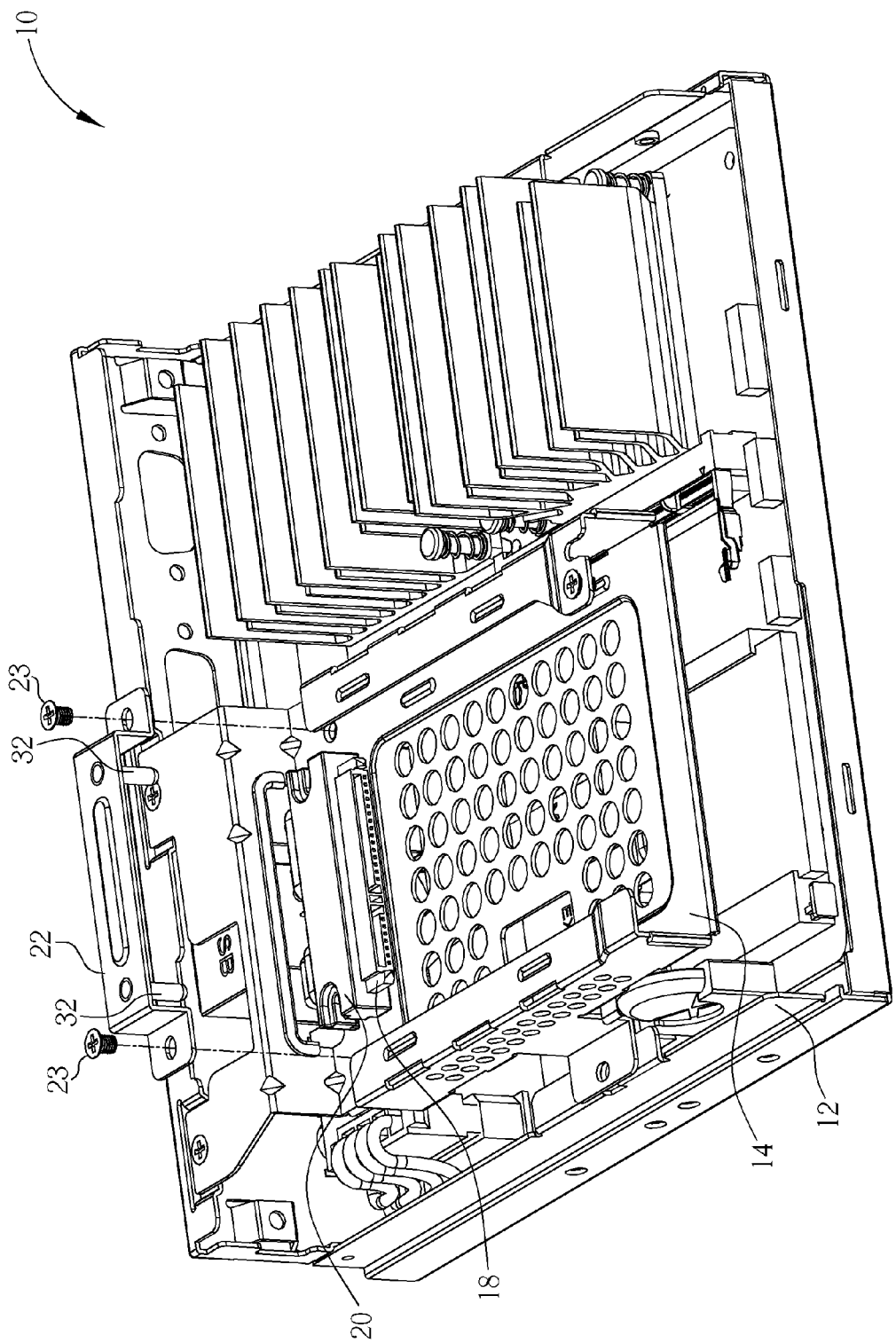
FIG. 2 is an internal exploded diagram of the electronic module in FIG. 1.

Please refer to FIG. 1 and FIG. 2. FIG. 1 is a diagram of an electronic module 10 according to a preferred embodiment of the present invention. FIG. 2 is an internal exploded diagram of the electronic module 10 in FIG. 1. In this embodiment, the electronic module 10 is preferably a computer host. As shown in FIG. 1 and FIG. 2, the electronic module 10 includes a case 12, a holding frame 14, a removable disk drive 16, a transmission cable 18, a shock-absorbing structure 20, a fixing part 22, a shock-absorbing pad 24, and a pulling rod 26. The case 12 may preferably be a housing for containing and protecting components (e.g. a motherboard, a power supply, etc.) installed inside a computer host. An opening 28 is formed on the case 12. As shown in FIG. 1, the electronic module 10 further includes a movable lid 30 for covering the opening 28 so as to prevent dust from entering the electronic module 10 and provide a burglarproof function to the electronic module 10. The holding frame 14 is disposed at a position of the case 12 corresponding to the opening 28. The holding frame 14 is used for holding the removable disk drive 16 so that the removable disk drive 16 can be disposed on the case 12 steadily. The removable disk drive 16 is disposed on the holding frame 14 and is removable from the opening 28. In this embodiment, the removable disk drive 16 is preferably a removable hard disk drive (i.e. assembly of a removable rack and a conventional hard disk drive). The transmission cable 18 is connected to the removable disk drive 16. The transmission cable 18 may be a power cable, a cable commonly used for signal and power transmission in a conventional computer host (e.g. an SATA (Serial Advanced Technology Attachment) cable), suitable for the removable disk drive 16. The shock-absorbing structure 20 is used for enveloping the transmission cable 18. The shock-absorbing structure 20 is preferably made of damping material (e.g. rubber material) for absorbing vibration generated during operation of devices inside the electronic module 10 or transmitted from the outer environment of the electronic module 10, so as to protect the removable disk drive 16 from a crash or data damages caused by excessive vibration.

Next, as shown in FIG. 2, the fixing part 22 is preferably fixed to the holding frame 14 by screws 23 (two shown in FIG. 2). The fixing part 22 includes at least one guide rod 32 (two shown in FIG. 2). The guide rod 32 is disposed through the shock-absorbing structure 20 so that the shock-absorbing structure 20 can move upward and downward along the guide rod 32 relative to the holding frame 14. The shock-absorbing pad 24 is disposed on the removable disk drive 16. In this embodiment, the shock-absorbing pad 24 is preferably made of damping material, such as rubber material, for absorbing vibration generated during operation of devices inside the electronic module 10 or transmitted from the outer environment of the electronic module 10, so as to protect the removable disk drive 16 from damages caused by excessive vibration. The pulling rod 26 is pivotally connected to the removable disk drive 16.

Figure 3:
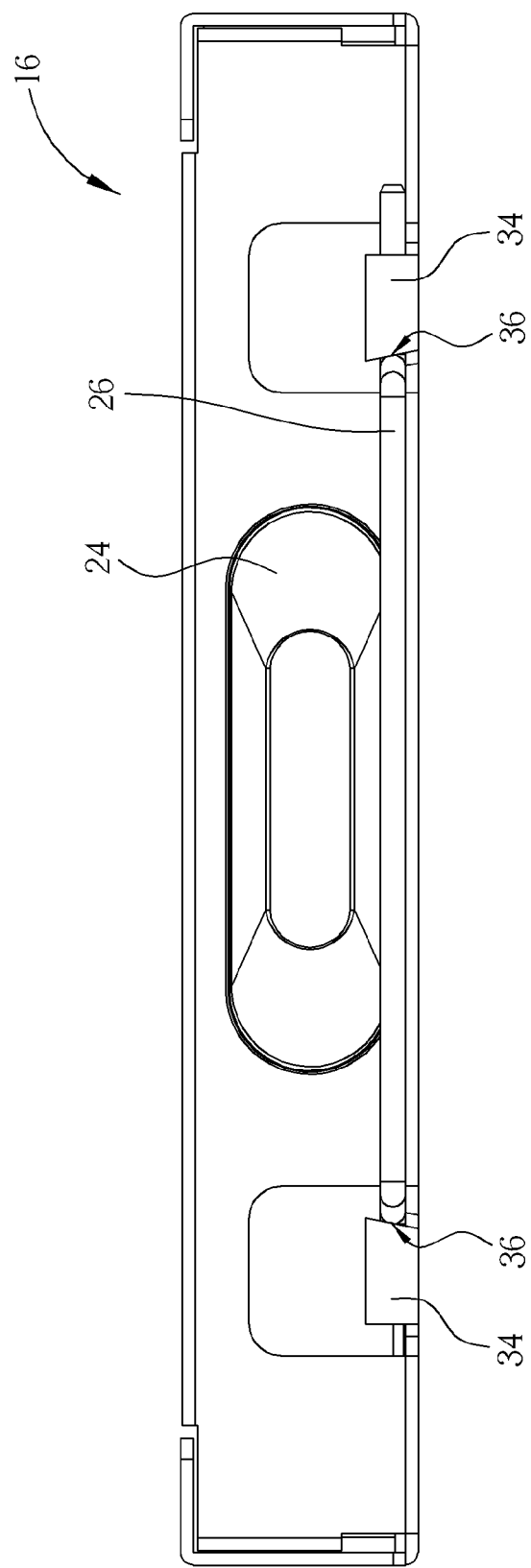
FIG. 3 is a front view of a removable disk drive in FIG. 1.
Figure 4:
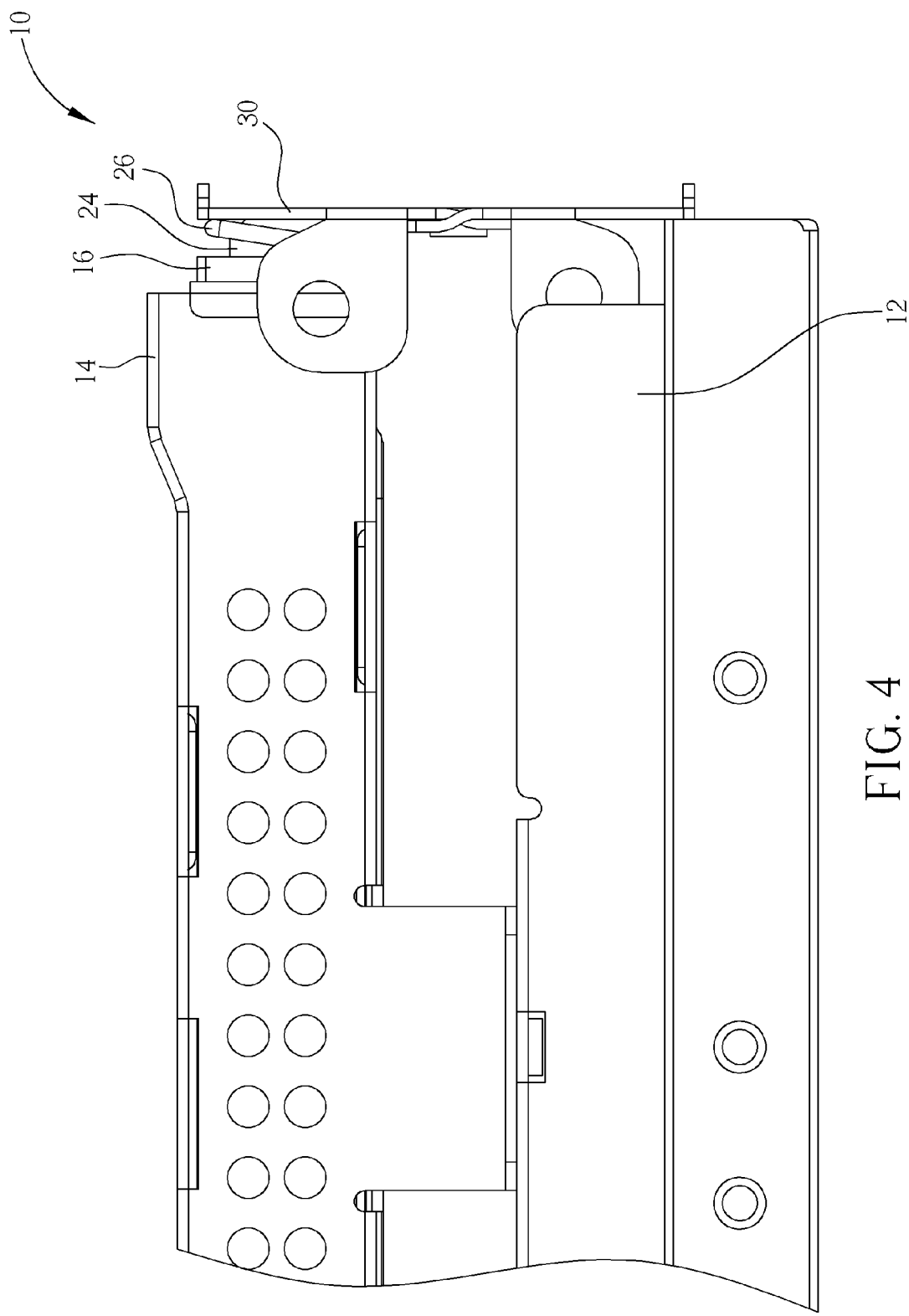
FIG. 4 is an internal partial diagram of the removable disk drive in FIG. 1 being installed in a case.

More detailed description for the shockproof design of the electronic module 10 is provided as follows. First, for the front configuration of the removable disk drive 16, the electronic module 10 can utilize disposal of the shock-absorbing pad 24 and the pulling rod 26 to respectively provide a shock-absorbing function and a vibration-isolating function to the removable disk drive 16. The related configuration is as shown in FIG. 3 and FIG. 4. FIG. 3 is a front view of the removable disk drive 16 in FIG. 1. FIG. 4 is an internal partial diagram of the removable disk drive 16 in FIG. 1 being installed in the case 12. As shown in FIG. 4, when the movable lid 30 covers the opening 28, the shock-absorbing pad 24 abuts against the movable lid 30 and the pulling rod 26 props against the movable lid 30. That is, when the movable lid 30 covers the opening 28, the pulling rod 26 is pushed by the movable lid 30 to rotate upward from a position as shown in FIG. 3 to a position as shown in FIG. 4 so as to prop against the movable lid 30, and simultaneously the shock-absorbing pad 24 also abuts against the movable lid 30.

In other words, for the shock-absorbing pad 24, when the removable disk drive 16 is installed on the holding frame 14 and the movable lid 30 covers the opening 28, the shock-absorbing pad 24 disposed on the removable disk drive 16 can abut against the movable lid 30 accordingly. In such a manner, the electronic module 10 can utilize the shock-absorbing property of the shock-absorbing pad 24 to absorb vibration generated during operation of devices inside the electronic module 10 or transmitted from the outer environment of the electronic module 10.

On the other hand, as shown in FIG. 3, two ends of the pulling rod 26 are pivotally connected to two pivot portions 34 of the removable disk drive 16, respectively. Thus, when the removable disk drive 16 is installed on the holding frame 14 and then the movable lid 30 covers the opening 28 of the case 12, the pulling rod 26 can be pushed by the movable lid 30 to rotate upward relative to the two pivot portions 34 from the position as shown in FIG. 3 to the position as shown in FIG. 4. During rotating of the pulling rod 26, as shown in FIG. 3, elastic deformation of the pulling rod 26 may appear since an inclined surface 36 is formed on the positions of the two pivot portions 34 corresponding to the pulling rod 26 respectively. As a result, the pulling rod 26 can prop against the movable lid 30 as shown in FIG. 4 by elastic force generated from its elastic deformation. At this time, the pulling rod 26 can be regarded as a vibration-isolating spring disposed between the movable lid 30 and the removable disk drive 16, meaning that the electronic module 10 can utilize disposal of the pulling rod 26 between the removable disk drive 16 and the movable lid 30 to provide a vibration-isolating function to the removable disk drive 16. Furthermore, when a user wants to open the movable lid 30 to remove the removable disk drive 16 from the opening 28, the user just needs to rotate the movable lid 30 relative to the case 12 so as to make the movable lid 30 not cover the opening 28. At this time, since the pulling rod 26 is no longer blocked by the movable lid 30, the pulling rod 26 may automatically rotate from the position as shown in FIG. 4 back to the position as shown in FIG. 3 by the said elastic force. In such a manner, the user can grasp the pulling rod 26 conveniently to remove the removable disk drive 16 from the opening 28.

In summary, for the shockproof design at the front end of the removable disk drive 16, the electronic module 10 can provide a shock-absorbing function and a vibration-isolating function to the removable disk drive 16 respectively by disposal of the shock-absorbing pad 24 and the pulling rod 26 between the movable lid 30 and the removable disk drive 16. Thus, a crash or data damages of the removable disk drive 16 caused by sudden impact or low-frequency vibration generated by the devices inside the electronic module 10 may be avoided accordingly.

Figure 5:
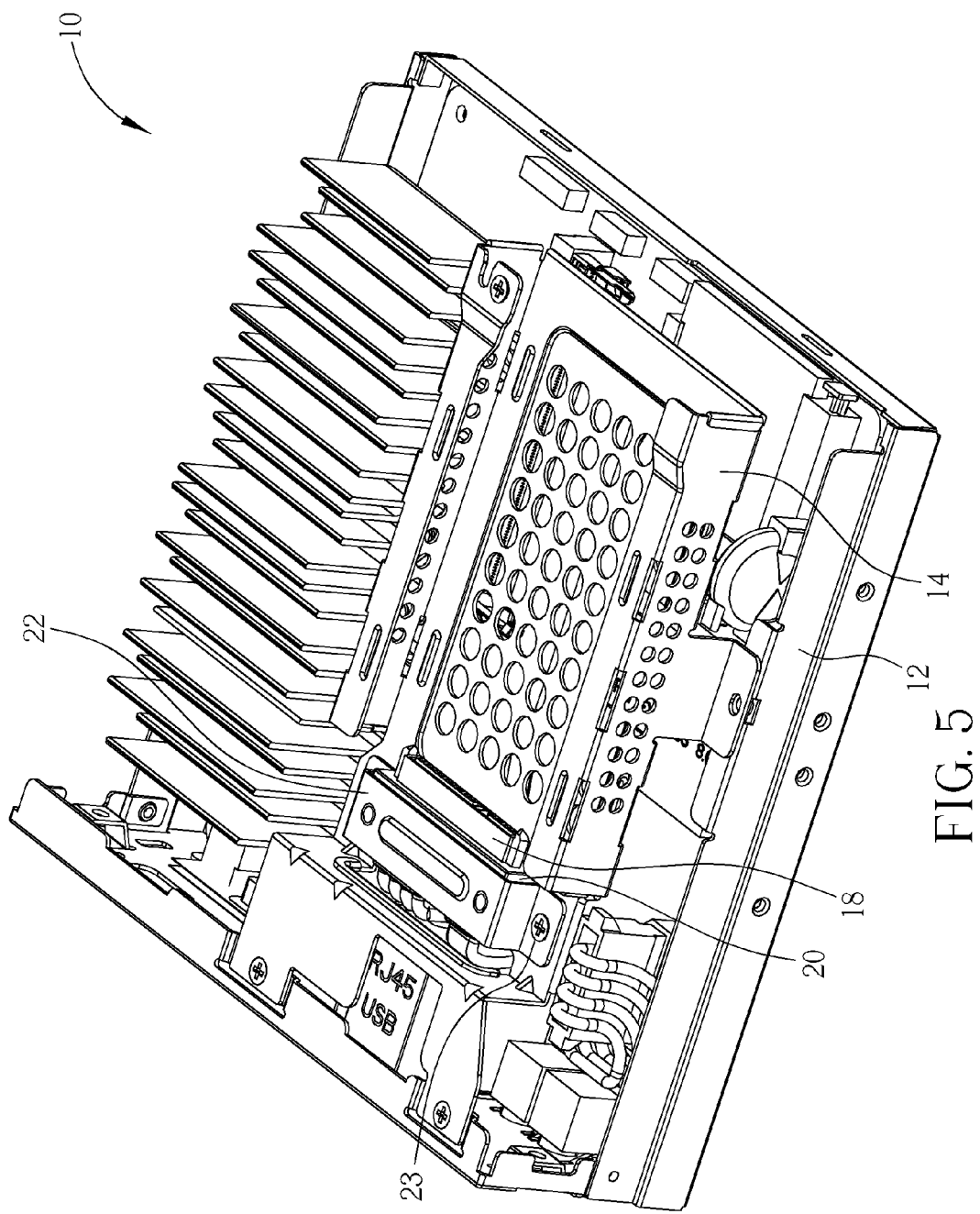
FIG. 5 is a diagram of a shock-absorbing structure in FIG. 2 being installed between a holding frame and a fixing part.

As far as the back configuration of the removable disk drive is concerned, the electronic module 10 can provide a shock-absorbing function to the removable disk drive 16 by the shock-absorbing property of the shock-absorbing structure 20 and the structural design of the shock-absorbing structure 20 being capable of moving upward and downward along the guide rod 32 relative to the holding frame 14. The related configuration may be as shown in FIG. 2 and FIG. 5. FIG. 5 is a diagram of the shock-absorbing structure 20 in FIG. 2 being installed between the holding frame 14 and the fixing part 22. As mentioned above, the shock-absorbing structure 20 can move upward and downward along the guide rod 32 relative to the holding frame 14. Thus, when the electronic module 10 receives vibration, the shock-absorbing structure 20 can not only absorb vibration transmitted from the guide rod 32, but also absorb vibration transmitted from the holding frame 14 when the shock-absorbing structure 20 collides with the holding frame 14 along the guide rod 32. In other words, the electronic module 10 can utilize the shock-absorbing property of the shock-absorbing structure 20 and contact between the shock-absorbing structure 20 and the holding frame 14 to absorb vibration generated during operation of devices inside the electronic module 10 or transmitted from the outer environment of the electronic module 10, so as to provide a shock-absorbing function to the removable disk drive 16. In summary, via disposal of the shock-absorbing pad 24 and the pulling rod 26 at the front end of the removable disk drive 16 and disposal of the shock-absorbing structure 20 at the back end of the removable disk drive 16, the electronic module 10 can provide the removable disk drive 16 with a suspension system for absorbing and isolating vibration. That is, when the electronic module 10 receives vibration or is in a low-frequency vibration state, the electronic module 10 can utilize the shock-absorbing structure 20, the shock-absorbing pad 24, and the pulling rod 26 to prevent the removable disk drive 16 from receiving vibration.

Furthermore, since the shock-absorbing structure 20 can move upward and downward along the guide rod 32 as shown in FIG. 2 relative to the holding frame 14, the assembly tolerance between the removable disk drive 16 and the holding frame 14 may be increased accordingly. Thus, the assembly process for installing the removable disk drive 16 on the holding frame 14 and connecting the removable disk drive 16 to the transmission cable 18 can be completed quickly without precise positioning, and time needed for assembling the electronic module 10 may be therefore reduced.

It should be mentioned that the method for providing the pulling rod 26 with elastic force to prop against the movable lid 30 is not limited to the said embodiment. For example, the pulling rod 26 can be pivotally connected to the removable disk drive 16 by a torsion spring instead, meaning that the present invention may utilize a suitable torsion spring to install on a position where the pulling rod 26 is connected to the pivot portion 34 for providing the pulling rod 26 with elastic force. Furthermore, the shock-absorbing structure 20, the shock-absorbing pad 24, and the pulling rod 26 mentioned in the said embodiment are an optional component in the electronic module 10. For example, the electronic module 10 may only have the shock-absorbing structure 20 and the fixing part 22 disposed at the back end of the removable disk drive 16, or may only have the pulling rod 26 or the shock-absorbing pad 24 disposed at the front end of the removable disk drive 16. As a result, the structural design of the electronic module 10 maybe simplified and its manufacturing cost may be reduced accordingly. As for which configuration is utilized, it may depend on the practical application of the electronic module 10.

Compared with the prior art, in which a shock-absorbing structure made of damping material is utilized to envelop a removable disk drive for providing a shock-absorbing function, the present invention involves utilizing disposal of a pulling rod and a shock-absorbing pad at the front end of a removable disk drive and disposal of a shock-absorbing structure at its back end, to provide a shock-absorbing function and a vibration-isolating function to the removable disk drive. In such a manner, even if the removable disk drive is in a low-frequency vibration state, the electronic module provided by the present invention may prevent the removable disk drive from receiving vibration, so that a crash or data damages of the removable disk drive caused by excessive vibration can be avoided. Furthermore, since the structural designs of the pulling rod, the shock-absorbing pad, and the shock-absorbing structure mentioned in the present invention do not need to match with the outer contour of the removable disk drive, the device compatibility of the electronic module may be therefore increased.

Those skilled in the art will readily observe that numerous modifications and alterations of the device and method may be made while retaining the teachings of the invention.

What is claimed is:

1. An electronic module with a shockproof function, the electronic module comprising:
   a case having an opening formed thereon;
   a holding frame disposed at a position of the case corresponding to the opening;
   a removable disk drive disposed on the holding frame in a manner of being removable from the opening;
   a transmission cable connected to the removable disk drive;
   a fixing part disposed on the holding frame; and
   a shock-absorbing structure movably disposed between the fixing part and the holding frame in a manner of enveloping the transmission cable.

2. The electronic module of claim 1 further comprising a movable lid pivotally connected to the case for covering the opening.

3. The electronic module of claim 2 further comprising:
   a pulling rod pivotally connected to the removable disk drive for propping against the movable lid when the movable lid covers the opening.

4. The electronic module of claim 3 further comprising:
   a shock-absorbing pad disposed on the removable disk drive for abutting against the movable lid when the movable lid covers the opening.

5. The electronic module of claim 4, wherein the shock-absorbing pad is made of rubber material.

6. The electronic module of claim 3, wherein two ends of the pulling rod are pivotally connected to two pivot portions of the removable disk drive respectively, and the two pivot portions respectively have an inclined surface formed thereon corresponding to the pulling rod.

7. The electronic module of claim 3, wherein the pulling rod is pivotally connected to the removable disk drive by a torsion spring.

8. The electronic module of claim 1, wherein the shock-absorbing structure is made of rubber material.

9. The electronic module of claim 1, wherein the fixing part is fixed to the holding frame by screws.

10. The electronic module of claim 1, wherein the fixing part comprises a guide rod disposed through the shock-absorbing structure, and the shock-absorbing structure is capable of moving upward and downward along the guide rod relative to the holding frame.

11. The electronic module of claim 1, wherein the removable disk drive is a removable hard disk drive.

12. An electronic module with a shockproof function, the electronic module comprising:
    a case having an opening formed thereon;
    a movable lid pivotally connected to the case for covering the opening;
    a holding frame disposed at a position of the case corresponding to the opening;
    a removable disk drive disposed on the holding frame in a manner of being removable from the opening; and
    a pulling rod pivotally connected to the removable disk drive for propping against the movable lid when the movable lid covers the opening.

13. The electronic module of claim 12 further comprising:
    a shock-absorbing pad disposed on the removable disk drive for abutting against the movable lid when the movable lid covers the opening.

14. The electronic module of claim 13, wherein the shock-absorbing pad is made of rubber material.

15. The electronic module of claim 12, wherein two ends of the pulling rod are pivotally connected to two pivot portions of the removable disk drive respectively, and the two pivot portions respectively have an inclined surface formed thereon corresponding to the pulling rod.

16. The electronic module of claim 12, wherein the pulling rod is pivotally connected to the removable disk drive by a torsion spring.

17. The electronic module of claim 12 further comprising:
    a transmission cable connected to the removable disk drive;
    a fixing part disposed on the holding frame; and
    a shock-absorbing structure movably disposed between the fixing part and the holding frame in a manner of enveloping the transmission cable.

18. The electronic module of claim 17, wherein the shock-absorbing structure is made of rubber material.

19. The electronic module of claim 17, wherein the shock-absorbing structure is fixed to the holding frame by screws.

20. The electronic module of claim 17, wherein the fixing part comprises a guide rod disposed through the shock-absorbing structure, and the shock-absorbing structure is capable of moving upward and downward along the guide rod relative to the holding frame.

* * * * *